United States Patent
Browning et al.

(10) Patent No.: US 9,251,727 B2
(45) Date of Patent: Feb. 2, 2016

(54) INDUCTIVELY COUPLED PRODUCT DISPLAY

(75) Inventors: Caleb Browning, Cathage, MO (US);
Carolyn Johnson, Lowell, MI (US);
Leroy B. Johnson, Lowell, MI (US);
Lynda Locke, Castro Valley, CA (US);
Jason B. Turner, Joplin, MO (US)

(73) Assignee: L&P Property Management Company, South Gate, CA (US)

( * ) Notice: Subject to any disclaimer, the term of this patent is extended or adjusted under 35 U.S.C. 154(b) by 810 days.

(21) Appl. No.: 13/529,046

(22) Filed: Jun. 21, 2012

(65) Prior Publication Data

US 2013/0342022 A1    Dec. 26, 2013

(51) Int. Cl.
*H02J 3/00* (2006.01)
*H02J 17/00* (2006.01)
*G09F 9/30* (2006.01)
*G09F 27/00* (2006.01)

(52) U.S. Cl.
CPC *G09F 9/30* (2013.01); *G09F 27/00* (2013.01); *H02J 17/00* (2013.01)

(58) Field of Classification Search
CPC .............. H02J 17/00; G09F 9/30; G09F 27/00
USPC ........................................................ 307/104
See application file for complete search history.

(56) References Cited

U.S. PATENT DOCUMENTS

| 4,732,276 | A | * | 3/1988 | Knecht | ................. | B65D 5/548 |
| | | | | | | 206/268 |
| 5,411,146 | A | | 5/1995 | Jarecki et al. | | |
| 5,537,126 | A | | 7/1996 | Kayser et al. | | |
| 6,018,299 | A | | 1/2000 | Eberhardt | | |
| 6,249,263 | B1 | | 6/2001 | Kayser et al. | | |
| 6,798,389 | B1 | | 9/2004 | Eberhardt, Jr. | | |
| 6,844,821 | B2 | | 1/2005 | Swartzel et al. | | |
| 7,792,711 | B2 | | 9/2010 | Swafford, Jr. et al. | | |
| 7,923,938 | B2 | * | 4/2011 | Sokola | ...................... | 315/209 R |
| 8,260,456 | B2 | | 9/2012 | Siegel et al. | | |
| 2002/0146282 | A1 | | 10/2002 | Wilkes et al. | | |
| 2003/0085187 | A1 | | 5/2003 | Johnson et al. | | |
| 2005/0134461 | A1 | | 6/2005 | Gelbman et al. | | |

(Continued)

FOREIGN PATENT DOCUMENTS

| WO | 2009117699 A2 | 9/2009 |
| WO | 2010094778 A1 | 8/2010 |

OTHER PUBLICATIONS

International Search Report with Written Opinion dated Nov. 20, 2013 in PCT Application No. PCT/US2013/046974, 9 pages.

(Continued)

*Primary Examiner* — Hal Kaplan
(74) *Attorney, Agent, or Firm* — Shook, Hardy & Bacon, LLP

(57) ABSTRACT

A product display apparatus is provided. The display has a forward face with at least one display element disposed thereon. The display element is activated in some way upon receiving power. An inductive receiving coil is located on a flap that is below the forward face. This inductive receiving coil receives power from an inductive transmission coil located in proximity to the display apparatus. The receiving coil provides power to the display element when the coil is in proximity to the transmission coil. This power is used to activate the display element, such as by, for example, illuminating it.

10 Claims, 10 Drawing Sheets

(56) References Cited

U.S. PATENT DOCUMENTS

| | | |
|---|---|---|
| 2007/0042614 A1 | 2/2007 | Marmaropoulos et al. |
| 2007/0138923 A1 | 6/2007 | Sokola |
| 2007/0165366 A1 | 7/2007 | Sokola |
| 2009/0008275 A1 | 1/2009 | Ferrari et al. |
| 2009/0248198 A1 | 10/2009 | Siegel et al. |
| 2009/0284179 A1 | 11/2009 | Ray et al. |
| 2010/0006462 A1 | 1/2010 | McGuire et al. |
| 2010/0200526 A1 | 8/2010 | Barkdoll |
| 2011/0259960 A1 | 10/2011 | Baarman et al. |
| 2011/0304316 A1 | 12/2011 | Hachmann et al. |
| 2013/0002422 A1 | 1/2013 | Wiese et al. |
| 2013/0024023 A1 | 1/2013 | Siegel et al. |

OTHER PUBLICATIONS

International Search Report with Written Opinion dated Nov. 15, 2003 in PCT Application No. PCT/US2013/046970, 8 pages.

Non-Final Office Action dated Mar. 20, 2014 in U.S. Appl. No. 13/529,042, 11 pages.

International Search Report with Written Opinion dated Dec. 2, 2013 in PCT Application No. PCT/US2013/046969, 9 pages.

Notice of Allowance dated Aug. 15, 2014 in U.S. Appl. No. 13/529,042, 9 pages.

Non-Final Office Action dated Aug. 14, 2015 in U.S. Appl. No. 13/529,007, 9 pages.

\* cited by examiner

INDUCTIVELY COUPLED PRODUCT DISPLAY

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to shelving, product packaging and marketing. More particularly, the present invention relates to product shelving and merchandise displays that are able to provide power to product packaging or a portion of the displays in a selective way, and to product packaging that is capable of using power provided by the shelving.

BACKGROUND OF THE INVENTION

In today's retail world, one of the challenges for those selling products is to get the attention of the buyer or consumer. This can be especially challenging as the retail shelf space becomes more crowded and competitive. Product manufacturers and retailers have tried different methods to garner this attention. For example, product packaging is specifically designed to "catch the eye" of the consumer. One particular method for garnering the attention, and hopefully interest, of the consumer is to provide a package or portion of a package, that utilizes provided power. Such packages could have simple electronic messages, audio, animated text or video, or simply lights, to attract a potential consumer.

The problem with the provision of power to packaging or products has typically been increased cost. This is especially true for packages that are made to contain the power source. In reality, the power source is only needed for a short time. The only time the power is needed in this environment is when the product is presented to the user. This short time is a small percentage of the time from when the product is made and packaged, to the time a consumer takes it off the shelf. If power is provided for the entire time, such as when power is provided directly in each package, the cost is high and the process is inefficient in that power is constantly provided even when it is not needed.

If power is not constantly provided, the problem has been how to achieve the selective provision of power to the packaging, in an efficient and cost effective manner. Moreover, it would be desirable to achieve this provision of power without necessarily requiring a completely new shelving system.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present invention generally relates to a product display apparatus. The display has a forward face with at least one display element disposed thereon. The display element is activated in some way upon receiving power. An inductive receiving coil is located on a flap that is below the forward face. This inductive receiving coil receives power from an inductive transmission coil located in proximity to the display apparatus. The receiving coil provides power to the display element when the coil is in proximity to the transmission coil. This power is used to activate the display element, such as by, for example, illuminating it.

In another embodiment, a product display apparatus is provided that has a front face. This front face has some type of display element on it that is activated when provided with power. The apparatus also has a rear face. An inductive receiving coil is printed or otherwise attached to this rear face. The receiving coil receives power from an inductive transmission coil when the receiving coil is in proximity to the transmission coil. A circuit board is also located on the rear face that provides logic to the system. When the receiving coil receives power from the transmission coil, the display element is activated in some way, such as by illumination.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
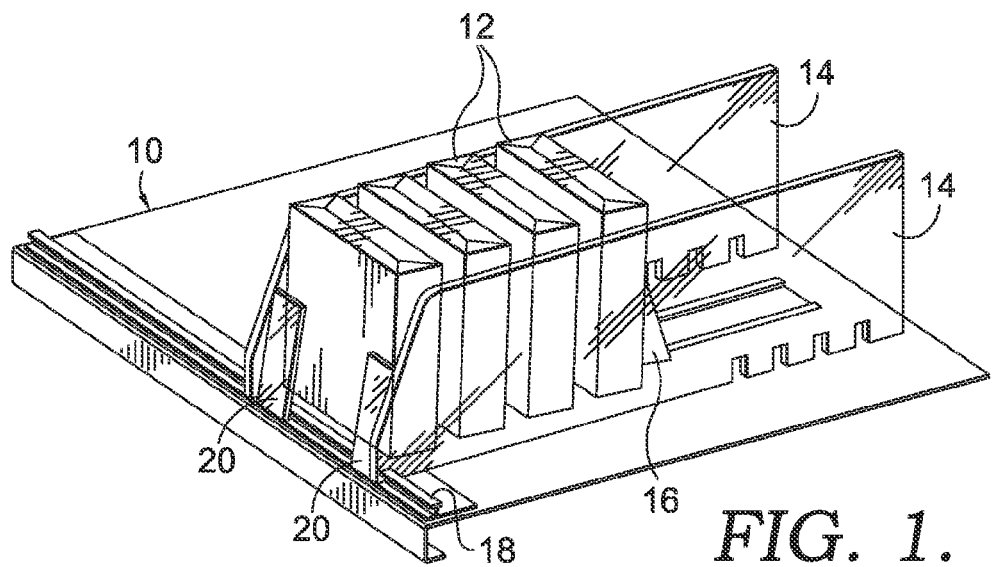
FIG. 1 is an isometric view of a prior art shelving and display system.

As best seen in FIG. 1, a prior art shelving system is shown and will be described for background and general context. A typical metal shelf 10 is shown that may be used to store and display a variety of products 12. These products 12 are held on the shelf 10 between a pair of shelf dividers 14. The products 12 are moved forwardly between the dividers 14 by a spring-loaded pusher 16. This pusher 16 biases the products 12 forwardly, so that as a consumer selects the forward-most product 12, the remainder of the products are automatically moved forward. A t-rail coupling system 18 may be built into shelf 10, or may be coupled to shelf 10 in some fashion. The dividers 14 can be held in place, in part, through the t-rail 18. The t-rail 18 can also hold in place a pair of front stoppers 20. The front stoppers 20 operate to stop the forward-most product 12 in the proper position for display and selection. It should be understood that many other forms of product display and shelving are known, and that this is merely one example given for context and background.

Figure 2A:
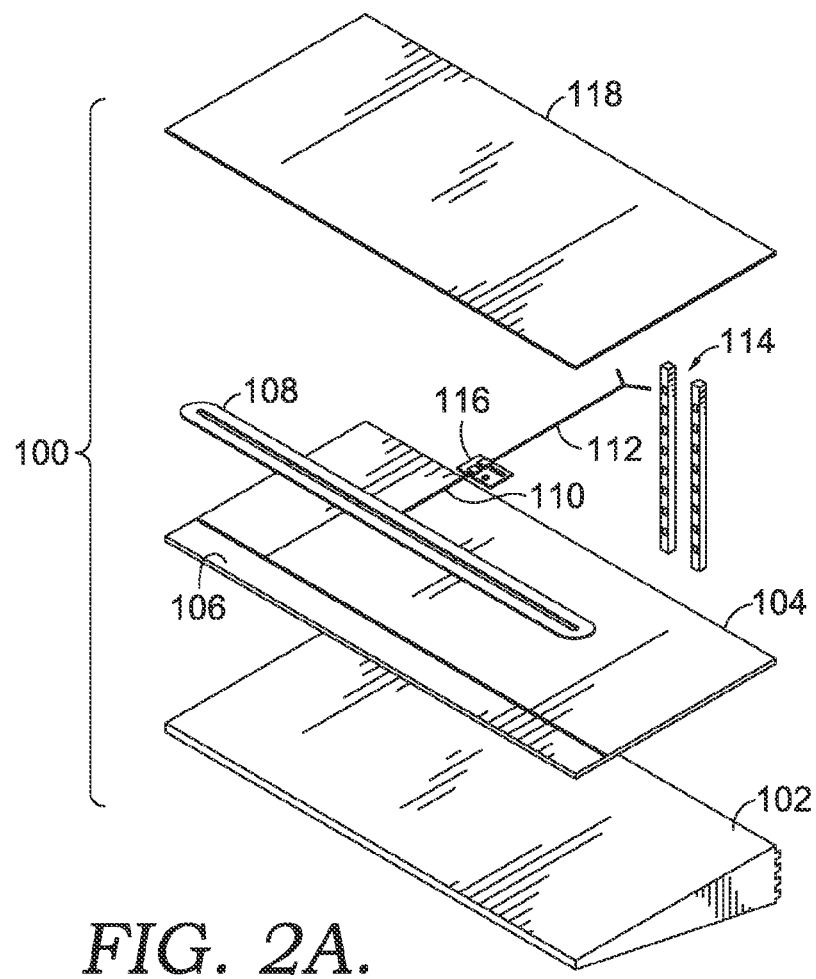
FIG. 2 is an exploded view of an embodiment of the shelving system of the present invention.
Figure 2B:
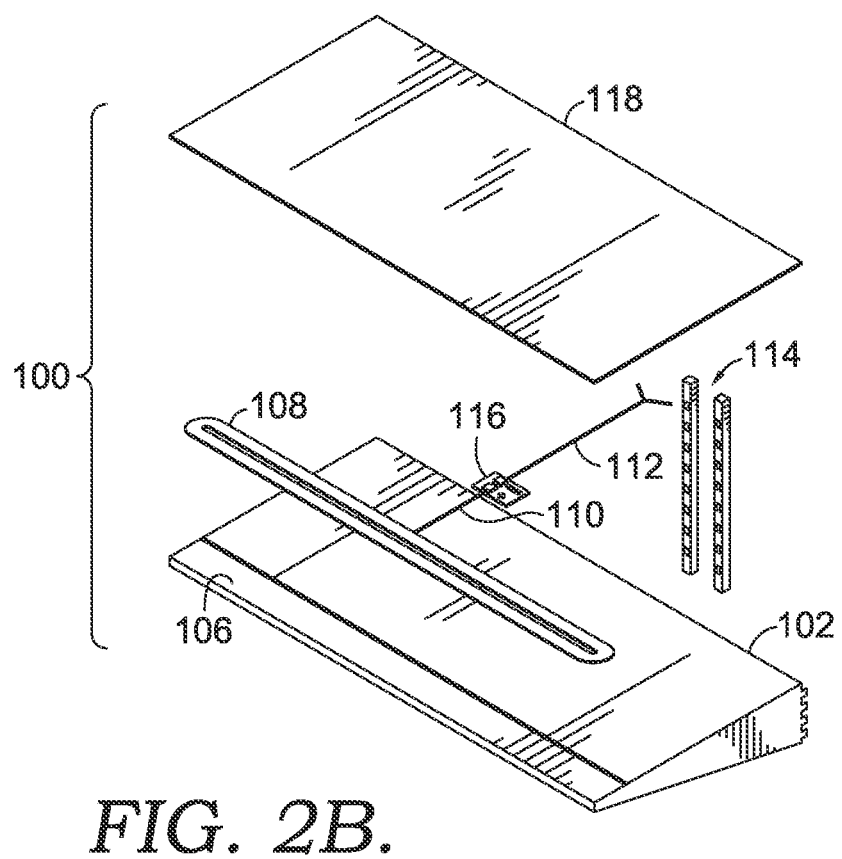
Figure 3:
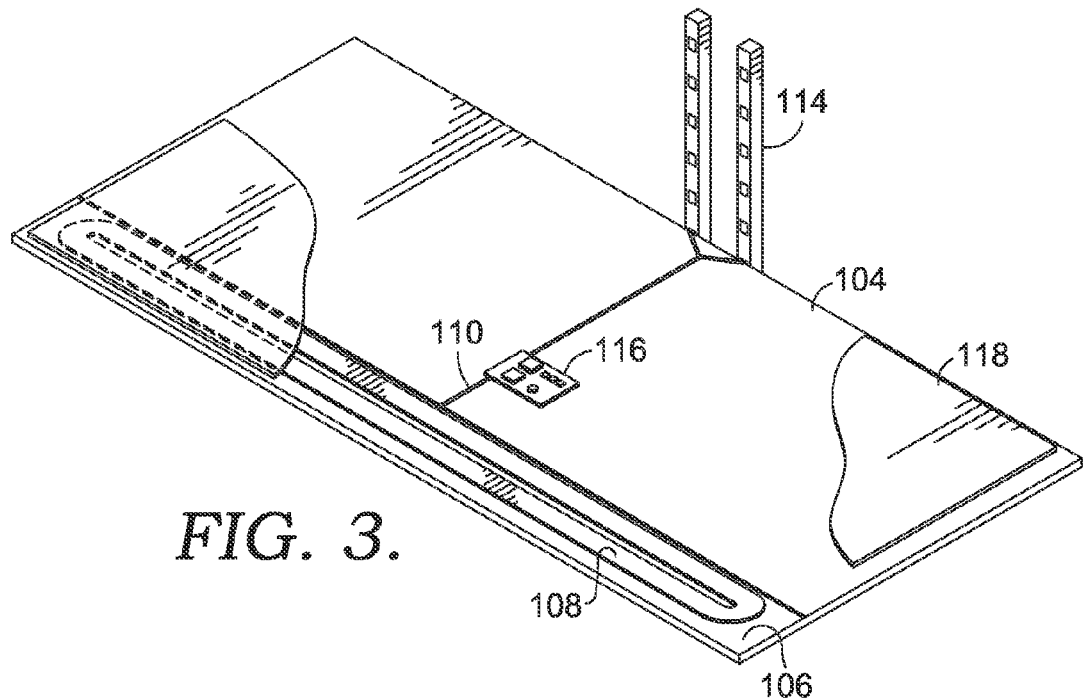
FIG. 3 is an isometric view of a single coil embodiment of the shelving system of FIG. 2.
Figure 4:
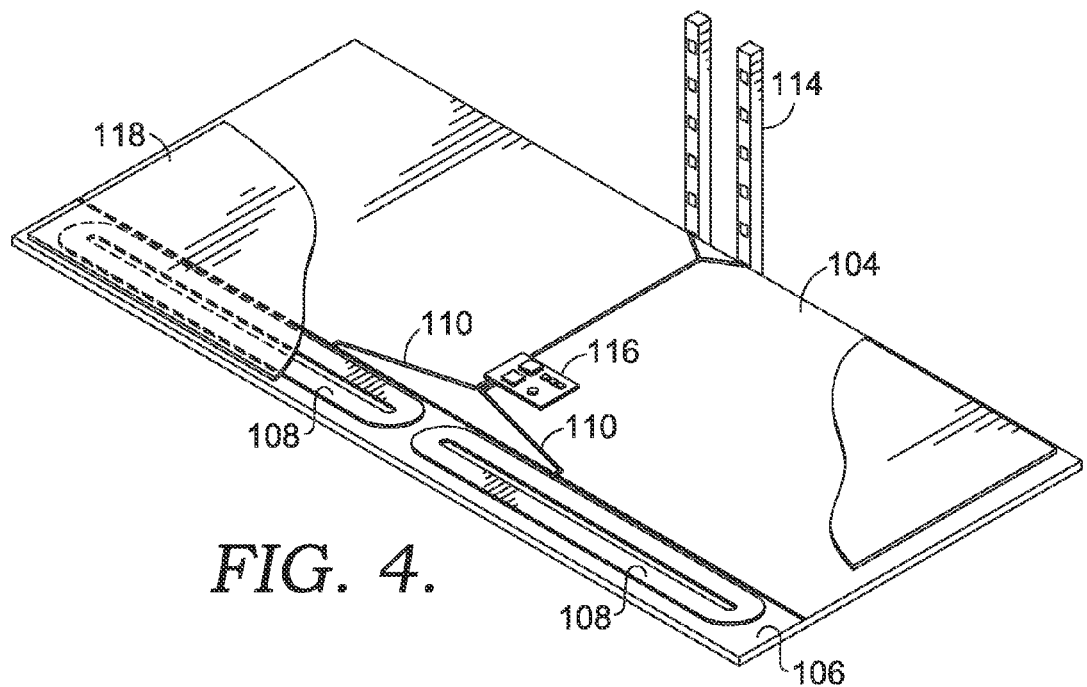
FIG. 4 is an isometric view of a double coil embodiment of the shelving system of FIG. 2

One embodiment of a shelving system 100 according to the invention is shown in FIGS. 2-4. As best seen in FIG. 2, this embodiment can be retrofitted onto an existing shelf 102. Shelf 102 is typically made of metal, but could be made of other materials as well. To provide a source of power to shelf 102, a first sheet 104 is provided. Sheet 104 is preferably shaped and sized to correspond to the shape and size of the shelf 102 onto which it is placed. Sheet 104 has formed therein a recess 106 proximate the front edge of the sheet. Recess 106 is sized to accommodate an inductive transmitting coil 108. The coil nests within recess 106. Power is provided to coil 108 via an electrical connection 110 to a power source 112. In this case, the power source 112 is shown coming from a vertical gondola 114 that extends vertically up the back of the shelves. Between the gondola 114 and the coil 108 is a circuit board 116 that provides the logic for coil 108. Technology has been developed that provides an intelligent, inductively coupled power circuit. While not necessary in all cases, this circuit dynamically seeks resonance and optimizes power transfer from a primary (transmitting) coil to a secondary (receiving) coil contained in a device or battery. The circuit allows the primary coil to determine and provide the power needs of the device or battery. By using this circuit, the primary supply circuit adapts its operation to match the needs of the device or battery. The circuit also allows the primary supply circuit to transfer power to multiple secondary coils simultaneously. Examples of the circuit and the operation of the circuit are contained in the following U.S. Patents, all of which are hereby incorporated by reference: U.S. Pat. Nos. 6,436,299; 6,673,250; 6,731,071; 6,806,649; 6,812,645; 6,831,417; 6,917,163; 6,975,198; 7,116,200; 7,118,240; 7,126,450; and 7,132,918. To provide a flat shelving surface, a second sheet 118 is disposed directly on top of sheet 104. This effectively sandwiches the coil 108 between the sheets 104 and 118. Preferably, sheets 104 and 118 are made from a non-magnetic material. This embodiment provides power proximate the front of shelf 102 though coil 108. Products or other devices can receive this power through a corresponding receiving, inductively coupled coil located in proximity to coil 108.

Another embodiment is shown in FIG. 2B. This embodiment eliminates sheet 104. As shown, shelf 102 includes a recess 106. Coil 108 nests within recess 106 and is again provided with power via electrical connection 110, as discussed above with respect to FIG. 2A. Sheet 118 forms the top surface and rests on top of coil 108 and shelf 102. This embodiment is particularly useful when shelving system 100 is sold as a new system, as opposed to a retrofit solution. It should be understood that coil 108 could be placed under shelf 102, so long as shelf 102 is non-magnetic, or has a through-channel in place to allow power from coil 108 to be transmitted.

It may be desirable to provide multiple, distinct coils within the recess 106. In this way, regions of different power levels can be created. FIG. 3 illustrates an embodiment with a single coil 108. FIG. 4 illustrates an embodiment with two coils 108. As shown, each coil 108 is separately electrically coupled to the power source 112, although both coils 108 can utilize the logic from a single circuit board 116. While single coil and double coil embodiments are shown in FIGS. 2-4, it should be understood that the invention is not limited to the number of coils provided.

Figure 5:
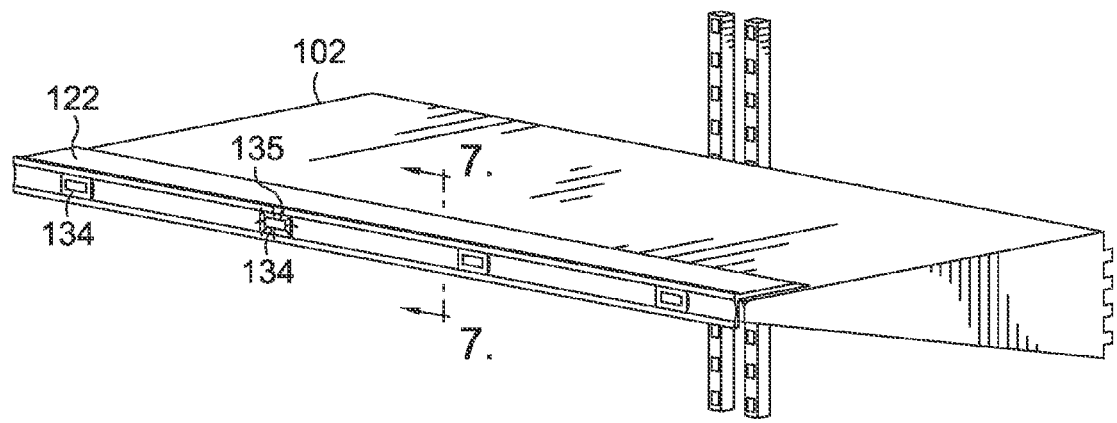
FIG. 5 is an isometric view of another embodiment of the shelving system of the present invention.
Figure 6:
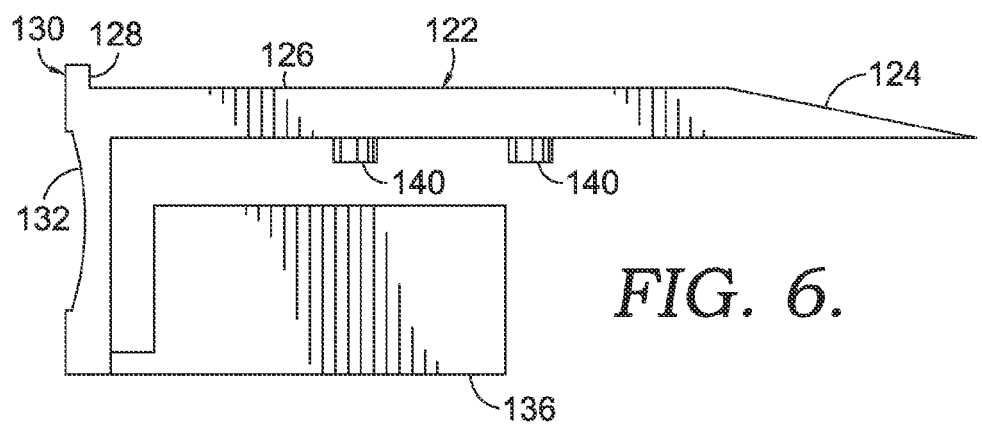
FIG. 6 is a side-view of the front piece of the shelving system shown in FIG. 5.
Figure 7:
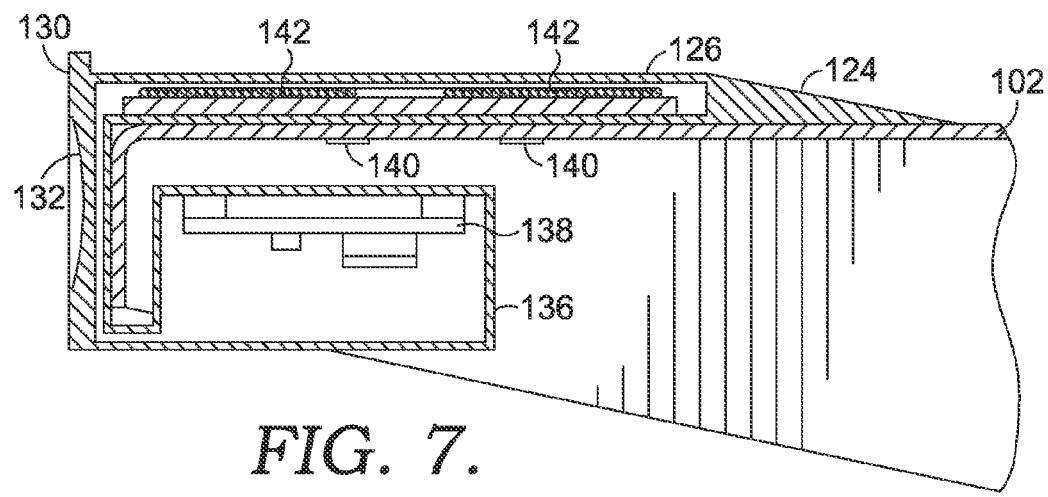
FIG. 7 is a partial cross-sectional view of the shelving system of FIG. 5, taken along line 7-7.
Figure 8:
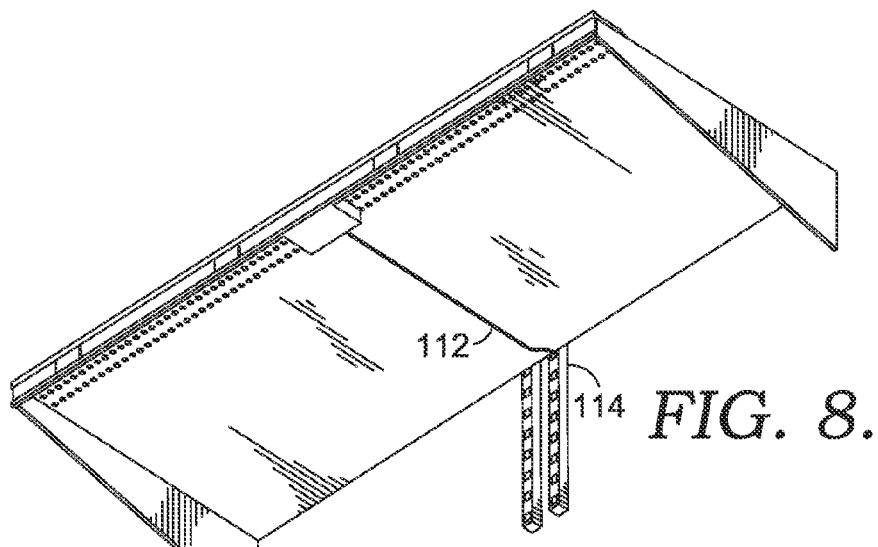
FIG. 8 is a bottom perspective view showing the shelving system of FIG. 5.

Another embodiment of the invention is shown in FIGS. 5-8. This embodiment is also useful on existing shelving, providing a retrofit solution. As best seen in FIG. 5, a shelf front 122 is coupled to shelf 102. As with the embodiment shown in FIGS. 2-4, shelf 102 is an existing shelf and can be made of metal or other materials. Shelf front 122 is coupled to shelf 102 at the forward edge of the shelf, rather than covering the entire shelf. As best seen in FIG. 6, shelf front 122 has a ramp 124 that slopes from the surface of shelf 102 gradually upward. Ramp 124 is used to move products from the surface of shelf 102 onto an upper surface 126 of shelf front 122. The width of upper surface 126 is such that it can accommodate a transmission inductive coil, as further described below. Upper surface 126 terminates with a front stop 128. In one embodiment, stop 128 projects completely along the width of the shelf front 122. A front face 130 of shelf front 122 includes a channel 132, sized and configured to accept display tags 134. Tags 134 are typically price tags, but other informational tags could also be placed within channel 132. As seen in FIG. 5, tags 134 can be traditional, non-powered tags, or can be tags configured to receive and use power. For example, and without limitation, tag 134 could contain a receiving coil to receive power from the transmission inductive coil near the front of shelf 102, and can use that power in some way, such as by illuminating a light 135. Powered display tags are discussed more-fully below. On the area of shelf front 122 below upper surface 126 is an enclosed box 136. Box 136 is used to house a circuit board 138, as best seen in FIG. 7. As best seen in FIGS. 6 and 7, shelf front 122 has a series of attachment posts 140. Posts 140 are sized and spaced to mate with holes typically provided in shelf 102 and serve to locate and retain shelf front 122 in place on shelf 102. A pair of posts are shown in FIGS. 6 and 7, and a series of these posts 140 are spaced along the span of shelf front 122. FIG. 7 also shows the placement of a transmission inductive coil 142 within a void formed within shelf front 122 under upper surface 126. The coil 142 may be placed within shelf front 122 either from above, or below, based on design choice. It is only necessary that the coil be located within shelf front 122 near the front edge thereof. As best seen in FIG. 8, power is provided to circuit board 138 and coil 142 through a wired connection to a power source 112, such as the vertical gondola 114 shown in FIG. 8. In practice, this embodiment allows shelf front 122 to be selectively placed on existing shelf 102 and coupled to power source 112. This will provided a transmission inductive coil on shelf 102 near the forward edge of the shelf. Products or other devices having a corresponding receiving inductive coil can receive this power and utilize it in a variety of ways.

Figure 9:
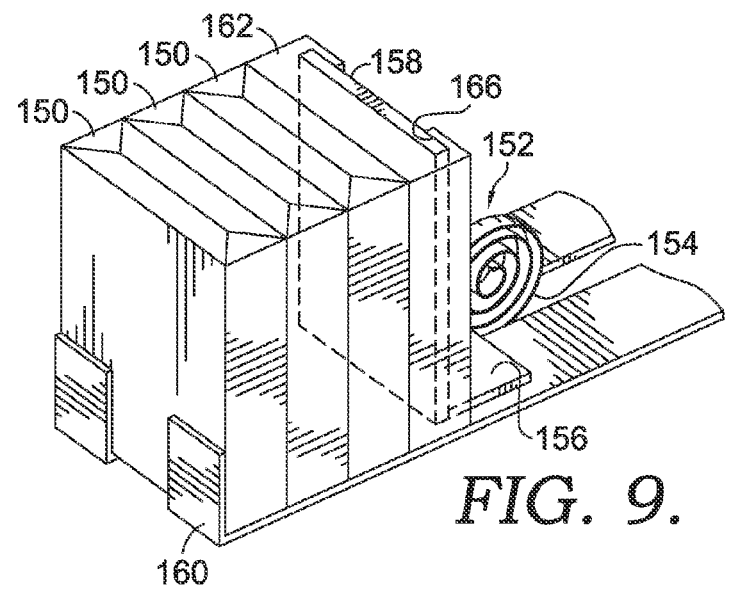
FIG. 9 is an isometric view showing an embodiment of a slide-on element for the pusher of the shelving system.
Figure 10:
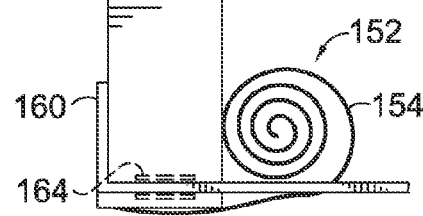
FIG. 10 is a side view of the embodiment shown in FIG. 9, with the slide-on element in the forward-most position.
Figure 11:
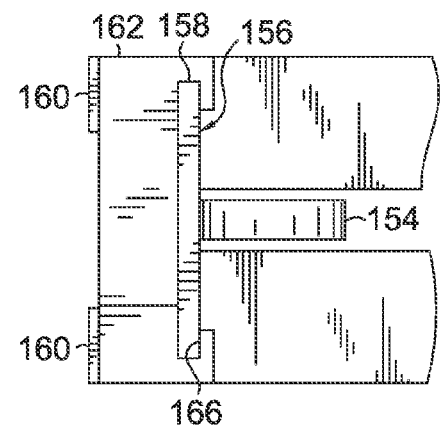
FIG. 11 is a top view of the slide-on element in engagement with the pusher.

Turning to FIG. 9, an embodiment is shown utilizing the power provided by shelf, such as shelf 102 described above and by the shelving embodiments shown and discussed above with respect to FIGS. 2-8. As shown, a shelf supports a number of products 150. Products 150 can be packaged with, or without, inductive receiving coils. The shelf has an inductive transmission coil, as best seen schematically in FIG. 10 and as described above with respect to FIGS. 2-8. The shelf is also equipped with a pusher system 152 that includes a spring 154. Spring 154 biases the products forwardly along the shelf. Spring 154 acts upon a pusher 156 that has an upstanding pusher paddle 158. Also shown in FIGS. 9 and 10 is a front stopper 160 that retains the products 150 on the shelf against the biasing force of the pusher system 152. In this embodiment, a display sleeve 162 is coupled to the paddle 158. As best seen in FIG. 10, sleeve 162 has an inductive receiving coil 164 disposed near the lower surface of the sleeve. As shown, sleeve 162 may be shaped like a rectangular box to mimic the form of products 150, but sleeve 162 may be shaped differently than products 150. Sleeve 162 may be coupled to paddle 158 in a variety of ways. As an example, sleeve 162 may be formed with an attachment channel 166, as best seen in FIG. 11. This channel 166 is formed to mate with the shape of paddle 158, such that sleeve 162 may be placed on paddle 158 by sliding the paddle 158 into the channel 166.

Once sleeve 162 is in place, it will receive power from the inductive transmission coil with shelf 102 when the products 150 are removed from shelf 162. In this way, sleeve 162 can be designed to utilize the provided power in some way. For example, sleeve 162 can utilize the provided power to provide an advertisement to a consumer, or message to the consumer to try a similar product from the same manufacturer. The ways in which the provided power can be utilized by the sleeve 162 are virtually limitless. This embodiment provides a method allowing use of the provided power, even when the products 150 are not designed to utilize the provided power. Importantly, the power is provided selectively, and is only used when the products 150 are removed from the shelf 102, such that sleeve 162 is near the inductive transmission coil.

Figure 13:
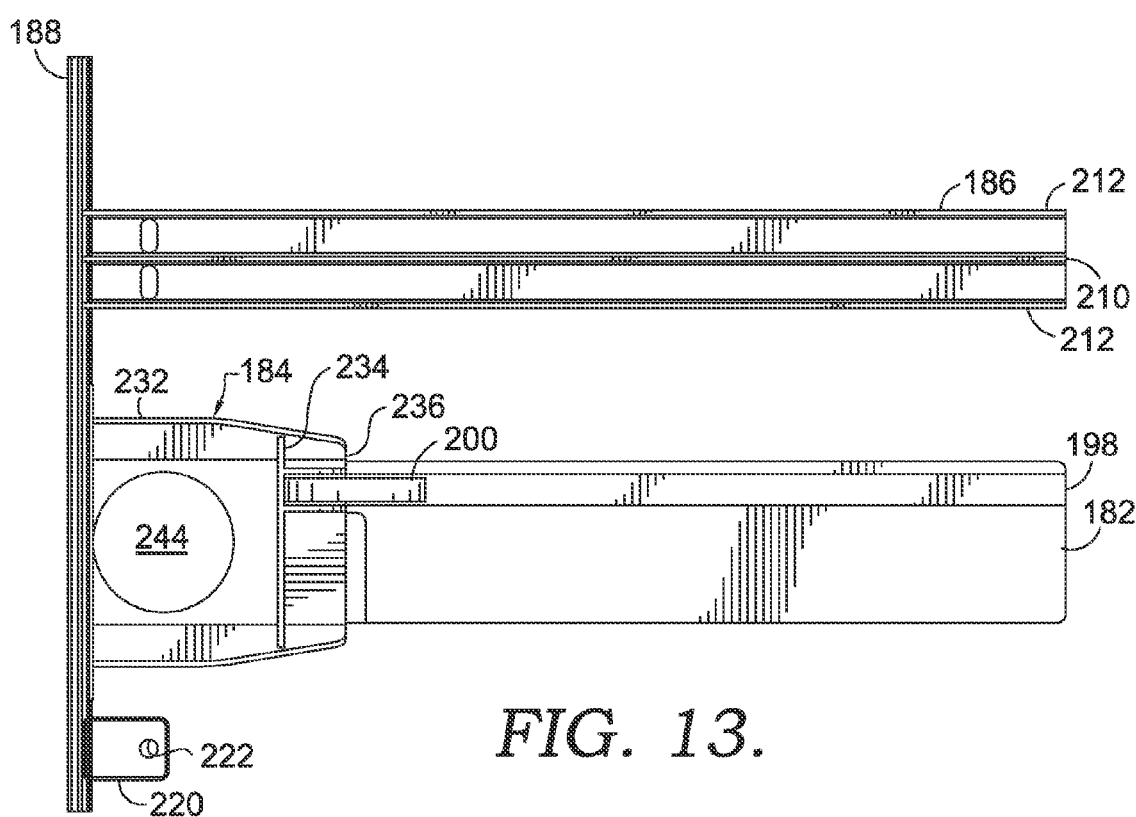
FIG. 13 is a top view of the pusher system of FIG. 12.
Figure 14:
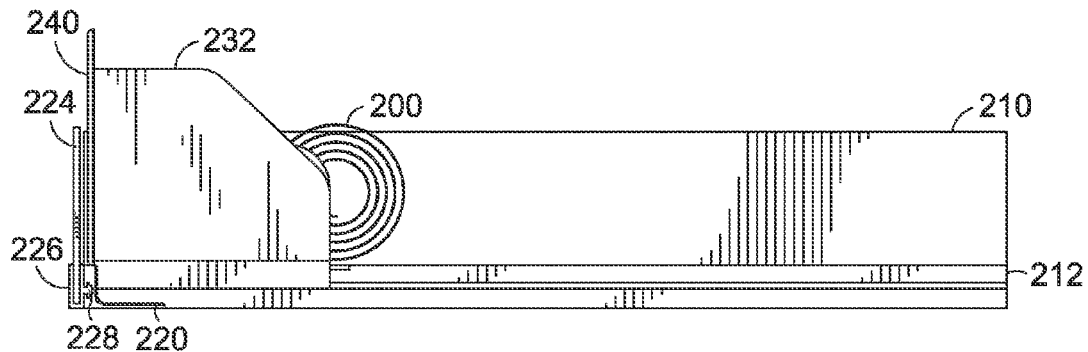
FIG. 14 is a side view of the pusher system of FIG. 12.
Figure 15:
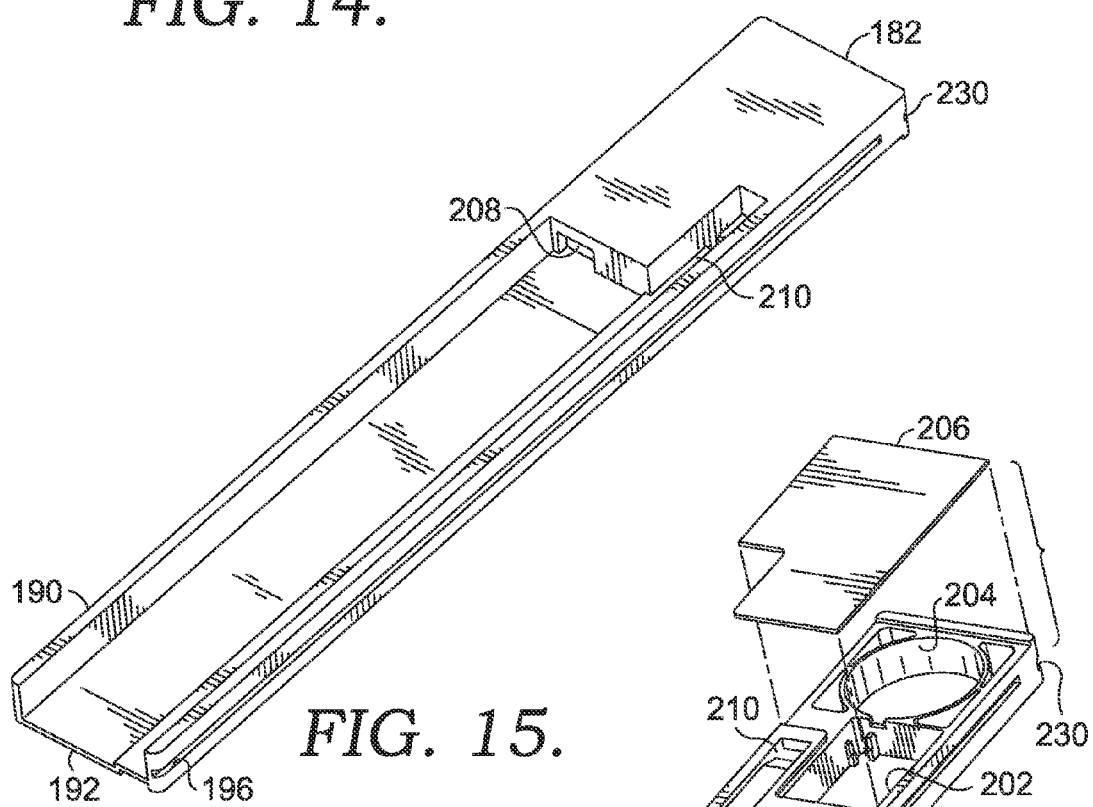
FIG. 15 is a bottom view of the pusher track used with the pusher system of FIG. 12.
Figure 16:
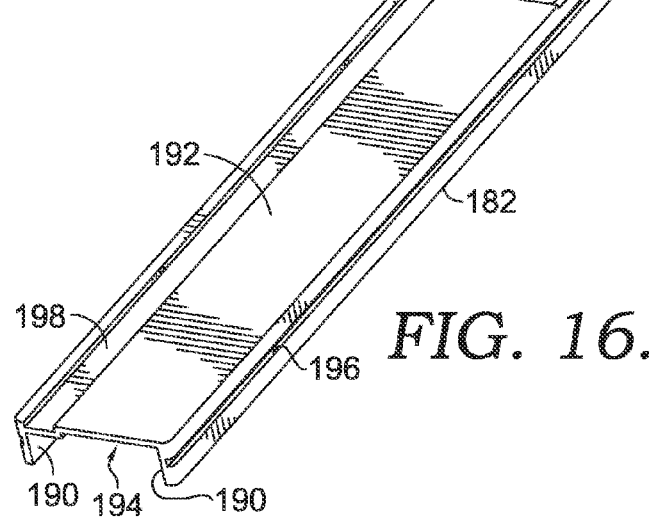
FIG. 16 is a top view of the pusher track used with the pusher system of FIG. 12

Yet another embodiment is shown in FIGS. 12-16. This embodiment can be used with existing shelving 102. Generally, a pusher system 180 is shown that includes a pusher track 182, a pusher 184, divider rails 186 and a front stop plate 188. Track 182 is best seen in FIGS. 15 and 16. Track 182 is supported on the surface of shelf 102 by a pair of rails 190. Each rail 190, along with a generally planar top section 192, defines a void 194 beneath the track. Void 194 is utilized as a wiring channel to provide power to the components of pusher system 180, as further described below. Each rail 190 also has a guide channel 196 formed therein extending generally the entire length of the track 182.

The top view of track 182 is shown in FIG. 16. Along one side of the top section 192, a recessed track 198 is formed to accommodate a biasing spring 200 (FIG. 14). As shown, spring 200 is a coil spring, but other types of springs or biasing forces could be used, so long as pusher 184 is biased forwardly with an acceptable force. Track 182 has a cavity 202 formed therein proximate the front of the track. Cavity 202 is used to house a circuit board (not shown). Track 182 has an additional cavity 204 formed therein, generally in front of cavity 202. Cavity 204 contains an inductive transmission coil, which is electrically coupled to the circuit board, which is in turn electrically coupled to a power source. Once the circuit board and coil are in place, a cover plate 206 is secured over cavities 202 and 204 to retain the circuit board and coil.

The bottom view of track 182 is shown in FIG. 15. The rails 190 define the void 194 beneath the track. In the wall defining the end of the void 194 is a pathway 208, allowing wired communication from the void to the circuit board within cavity 202, and the coil within cavity 204. Additionally, track 182 has an attachment area 210 that accommodates the attachment of the spring 200.

Figure 12:
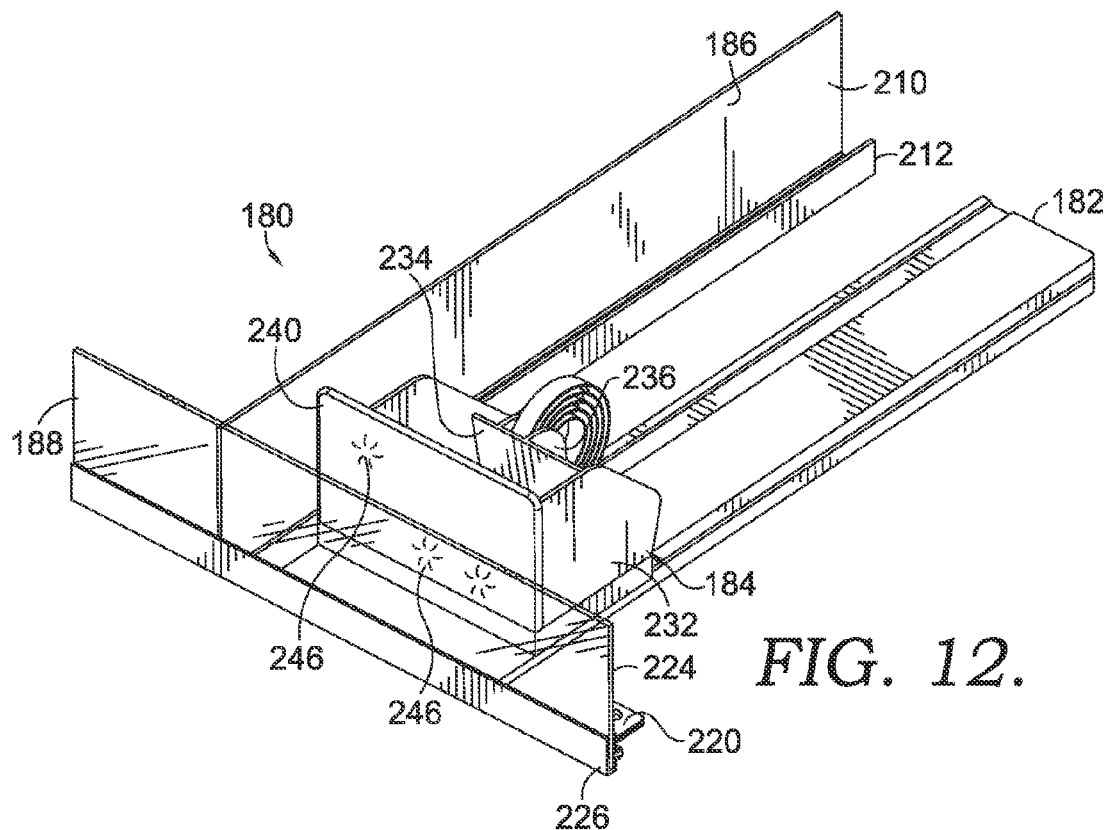
FIG. 12 is an isometric view of another embodiment of a pusher system of the present invention.

Turning to FIGS. 12-14, a more complete view of the pusher system 180 is shown. As stated above, the pusher system includes a divider rail 186. FIGS. 12 and 13 show only one divider rail for clarity, but it should be understood that at least one additional divider rail 186 would be installed. Rail 186 has an upstanding central plate 210, and lower guide legs 212, with one guide leg 212 on each side of plate 210. Legs 210 operate to support products or merchandise from the bottom, while plate 210 operates to provide support from the sides. Rails 186 can be coupled to a shelf, such as shelf 102, or can be coupled to the front stop plate 188.

Front stop plate 188 includes an L-shaped attachment bracket 220. Bracket 220 has a hole 222 that is used to attach the bracket to a shelf. The other end of bracket 220 is coupled to the front face 224. Face 224 is preferably transparent, the importance of which is discussed more fully below. Face 224 is held in place within a u-shaped member 226. Member 226 operates to secure face 224 and hold it in an upright orientation. As best seen in FIG. 14, the back side of member 226 includes an attachment head 228. Preferably, head 228 is integrally formed with member 226 and extends along the width of member 226. As best seen in FIGS. 15 and 16, track 182 has a mating channel 230 along the front face thereof. Channel 230 is used in cooperation with head 228 to secure track 182 to member 226. Member 226 is held in place on the shelf by bracket 220. Preferably, rails 186 have a channel similar to channel 230. This allows the rails 186 and the track 182 to be adjusted laterally along the shelf.

Pusher 184 has a pair of opposed, upstanding side panels 232. Each side panel 232 has, on its lower end, a protrusion that mates with channel 196 to maintain the pusher in place on track 182. Extending between the side panels 232 is spring plate 234. As best seen in FIG. 12, spring plate 234 has a pair of spaced-apart, rearward extending ears 236. Ears 236 operate as an aide to keep spring 200 properly located. Also between and across the side panels 232 is the front pusher face 240. Front face 240 is configured to receive electrical power, and to provide a display of some type upon receipt of electrical power. As an example, face 240 may have display elements 246 as shown in FIG. 12. Because front face 224 is preferably transparent, elements 246 are visible even through front fact 224. As best seen in FIG. 13, pusher 184 has an area roughly defined by front face 240, side panels 232 and spring plate 234 that accommodates an inductive receiving coil 244. Coil 244 is electrically coupled to the front face 240, such that when the receiving coil 244 is energized, front face 240 can utilize the provided power to activate display elements 246.

In operation, pusher system 180 is installed on existing shelving, such as shelf 102 described above. Bracket 220 is secured to the shelving, thereby holding the remainder of the components of pusher system 180 in place. Rails 186 and track 182 may further be secured to the shelf using any conventional attachment mechanisms. As stated above, two rails 186 are installed to define a boundary for the products to be placed on the shelf, and are spaced according to the width of the displayed products. Pusher 184 is guided along track 182, and is biased towards front face 224 by spring 200. When products are in place, with the pusher distanced from face 224, power is not provided to coil 244. However, when the last product is removed, coil 244 receives power from the coil within track 182. This power is provided to front face 240, which activates display elements 246, which can be, for example, a message, artwork, audio track, or any other desired display. Additionally, with pusher system 180, any product packaging having an inductive receiving coil can utilize the power provided by the transmission coil in track 182. This power is provided selectively only to the front-most product, which is the only product that really needs any type of additional display elements.

Figure 17:
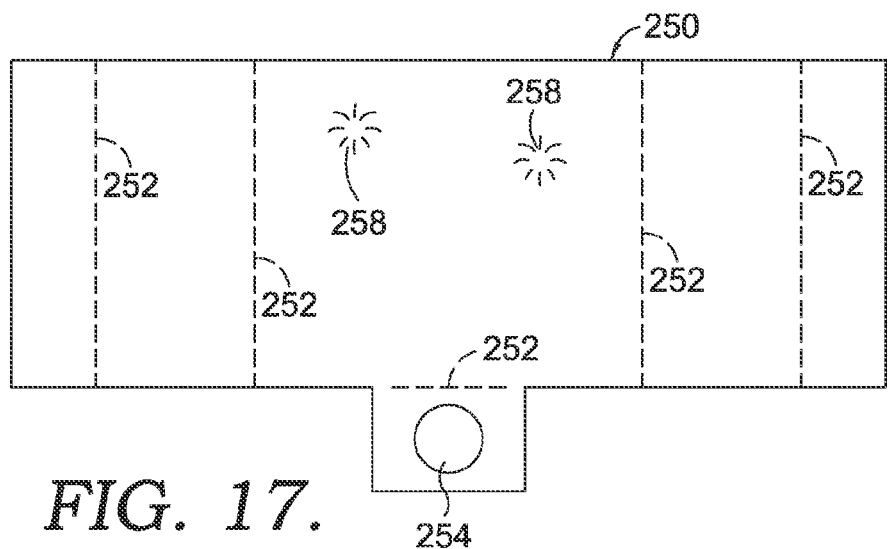
FIG. 17 is a retrofit solution for use with any of the shelving and pusher systems of the present invention.
Figure 18:
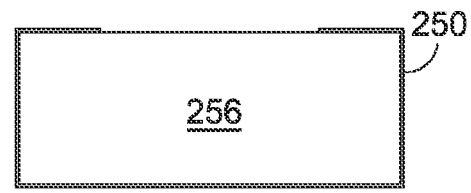
FIG. 18 is a top view of FIG. 17.
Figure 19:
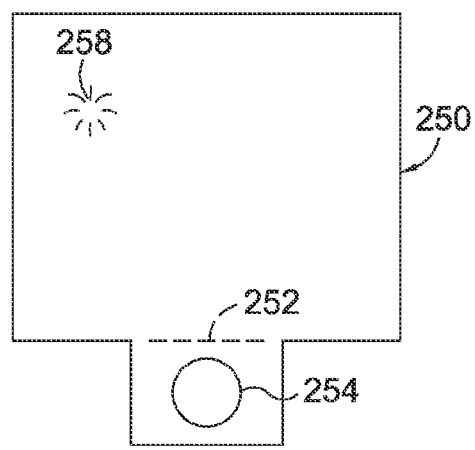
FIG. 19 is an alternative embodiment similar to FIG. 17.

As described above, a system such as those described in FIGS. 2-16 can be used to provide power through an inductive transmission coil at the front of a display shelf. Different elements can use this power in different ways. The front face 240 of the pusher is one example. But products on the shelf can also be equipped with an inductive receiving coil, and can use the power to provide information or other marketing-type displays on the packaging itself. In the case where the packaging is not made with such an inductive receiving coil, the retrofit solution shown in FIGS. 17-19 may be used. As shown in FIG. 17, a secondary cover 250 is shown in a generally rectangular shape. Cover 250 has a number of fold lines 252 that are used to fold the cover into a box-like shape. Additionally, cover 250 is equipped with an inductive receiving coil 254. In this embodiment, coil 254 is preferably printed directly onto the cover. As such, the coil is relatively thin. As shown in FIG. 18, cover 250 is formed by folding along the fold lines 252 into a shape that can surround a product 256. Product 256 can come in a variety of shapes and sizes, and cover 250 is formed from a blank such as that shown in FIG. 17 to correspond to the size and shape of the desired product 256. The coil 254 is folded such that it is located under the product 256. In this way, any product 256 can be retrofitted to take advantage of the power provided on the shelf. Cover 256 has elements 258 in electrical communication with coil 254 that light up, or otherwise use power, when the product 256 is moved forwardly on the shelf such that coil 254 is in communication with the inductive transmission coil at the front of the shelf. A similar embodiment is shown in FIG. 19, with cover 250 designed to cover the front of product 256. Preferably, some type of adhesive or other fastening material is used to affix cover 250 to product 256. As with the embodiment shown in FIG. 17, the cover 250 can have any number of different uses of the received power, shown as exemplary element 258. Likewise, cover 250 is equipped with a receiving coil 254, folded under cover 250 along fold line 252. Again, while the shape of cover 250 is shown as generally rectangular, the cover 250 could take any of a variety of shapes, and can be designed to completely or partially cover product 256.

Figure 20:
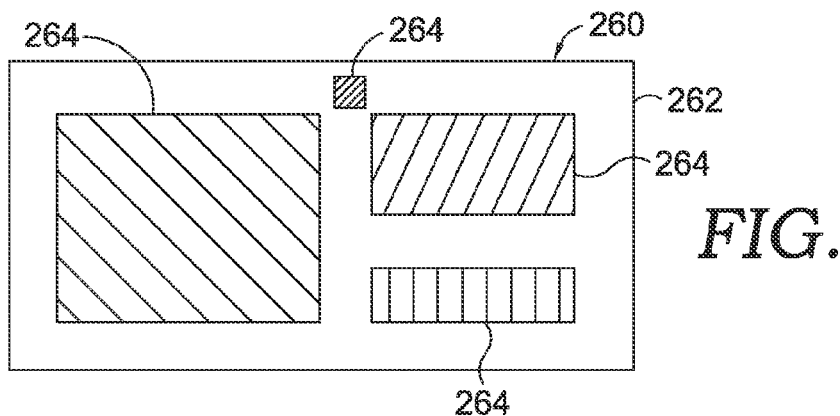
FIG. 20 is a front view of a display tag for use with any of the shelving and pusher systems of the present invention.
Figure 21:
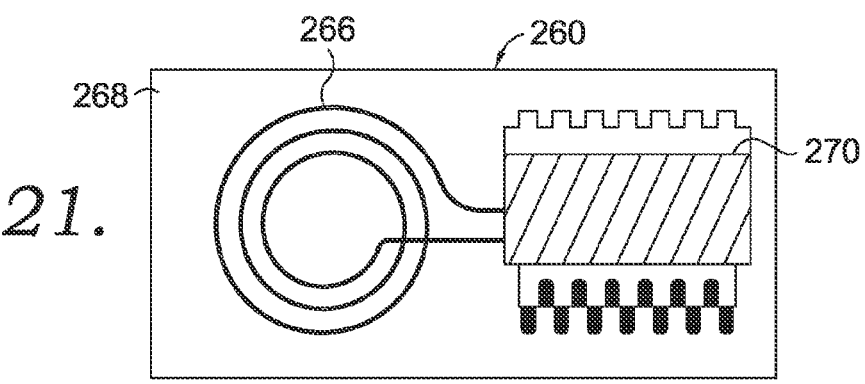
FIG. 21 is a rear view of the display tag of FIG. 20.
Figure 22:
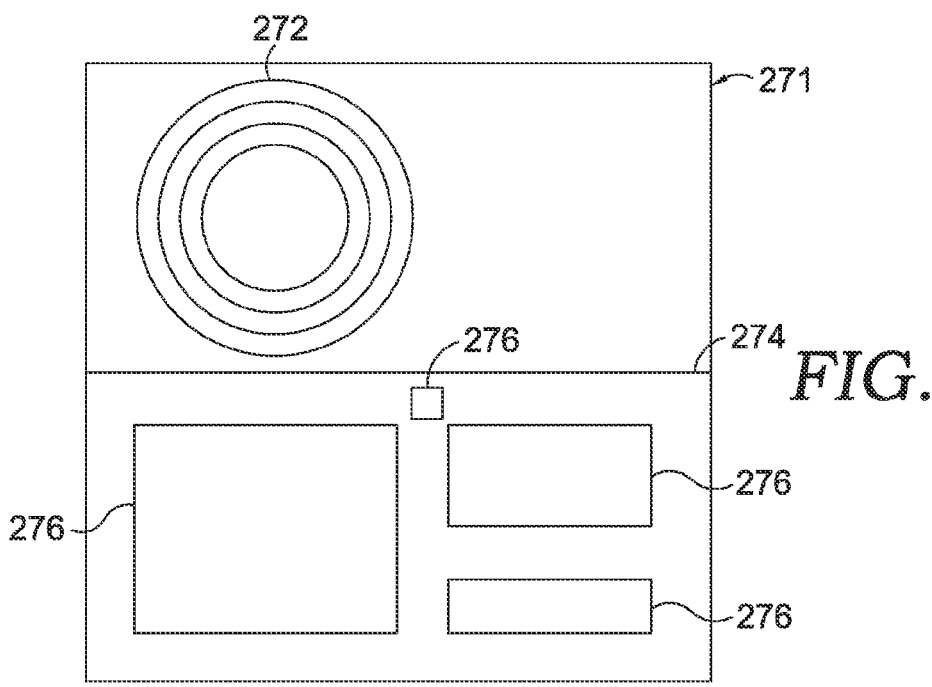
FIG. 22 is a top view of another embodiment of a display tag for use with any of the shelving and pusher systems of the present invention.

Another use of the power provided in the shelf is the provision of improved display tags as shown in FIGS. 20-22. The tags shown can be placed as shown by tags 134 in FIG. 5. FIGS. 20 and 21 show the front and rear faces, respectively, of a tag 260. Tag 260 has a front face 262, upon which are a number of display elements 264. At least one of elements 264 is designed to use power, such as by blinking or lighting up, etc. The elements 264 receive power from a receiving coil 266 printed on the back face 268 of the tag. The coil 266 receives power from the inductive transmission coil in the corresponding shelf. In addition to coil 266, a printed circuit 270 is also disposed on back face 268. A similar embodiment is shown in FIG. 22 with tag 271. Tag 271 is shown with a printed receiving coil 272 in one area. Typically, a circuit, such as circuit 270 of FIG. 21, is also included and coupled to coil 272. It is not shown in FIG. 22 for the sake of simplicity. This area is separated by a fold line 274. On the other side of the fold line are display elements 276, at least some of which are designed to use power. In use, the tag 271 is folded along line 274, and is then located on the front face of a display shelf having inductive transmission coils along the front edge. This allows the receiving coils 266 and 272 to receive power from the transmission coils, and to thereby illuminate or otherwise power up the display elements 264 and 276.

Figure 23:
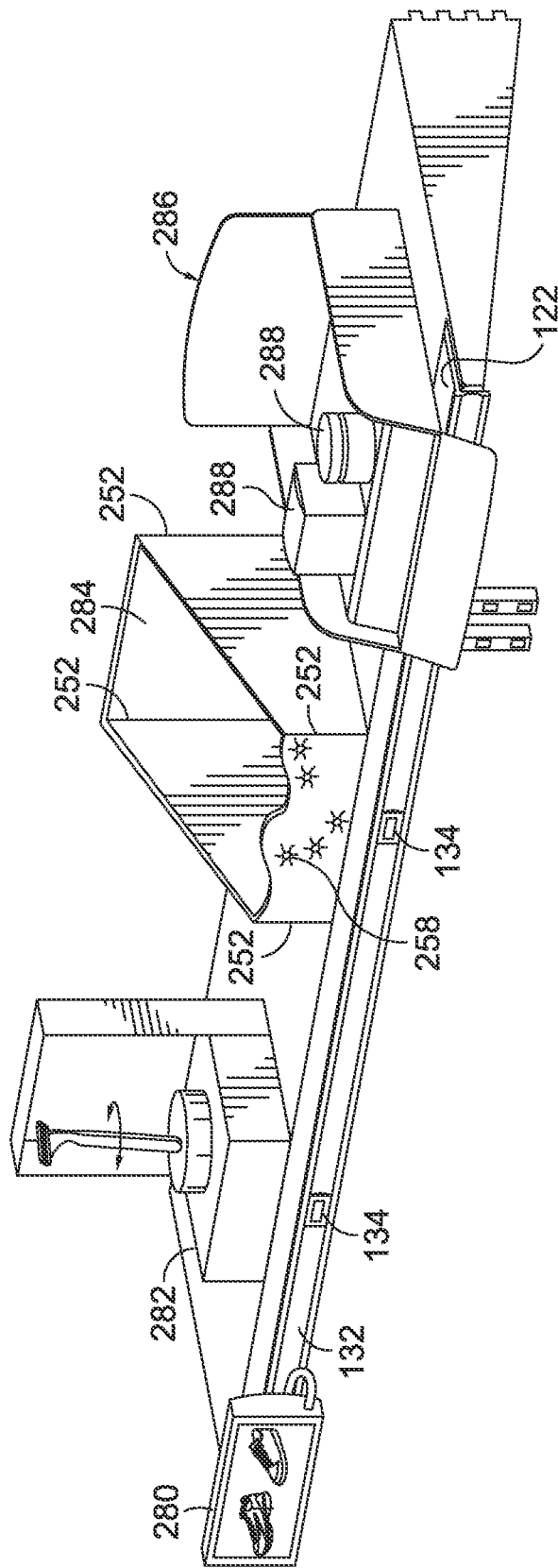
FIG. 23 is view of an embodiment showing multiple possible uses of the power provided by the shelf.

An embodiment showing multiple uses of the inductive power from shelf front 122 is illustrated in FIG. 23. As shown, FIG. 23 uses the shelf front 122 as described in connection with FIGS. 5-8. It should be understood that any of the shelving systems described above could be used to provide the power. As shown, a monitor 280 may be coupled to the shelf front 122, such as by using channel 132. The monitor 280 can be equipped with an inductive receiving coil to receive power from the inductive transmission coil provided by shelf front 122. Monitor 280 can provide product relevant information, advertising or other material to a consumer. A product display providing motion to a product could also be provided, as represented by rotary display 282. In this example, display 282 contains a motor that rotates the product, such as a razor, using the power provided by shelf front 122. A box 284, similar to that described above with respect to FIG. 17, can be formed along fold lines 252, and may contain elements 258 that use the power provided by shelf front 122 in some way. As with the embodiment shown in FIG. 17, the box 284 contains an inductive receiving element that receives power from the shelf front 122. The box 284 is useful in what is now known as retail ready packaging applications. Finally, a product glorifier 286 is shown in FIG. 23. Glorifier 286 also contains a receiving coil and uses the power received from shelf front 122 to illuminate products 288. This can provide under-lighting to further enhance the display of products 288.

A number of embodiments have been shown and described that provide power to shelving and displays. The power is provided where needed, and when needed. In addition, a number of uses for the provided power have been described. It should be understood that the particular uses of the power are not exhaustive, and that other uses for the provided power are within the scope of this invention.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:
1. A product display cover, comprising:
   a blank for forming a secondary cover corresponding to an exterior shape of a product packaging, said blank comprising:
      a display element disposed at an outer surface of said blank that is activated upon receiving power;
      an inductive receiving coil coupled to said blank, said receiving coil adapted to receive power from an inductive transmission coil located in proximity thereto, wherein said receiving coil provides power to said display element when in proximity to the transmission coil, thereby activating said display element; and one or more fold lines positioned at locations corresponding to the exterior shape of the product packaging, such that when the blank is folded along the one or more fold lines the secondary cover corresponding to the exterior shape of the product packaging is created.

2. The product display cover of claim 1, wherein the display element and the receiving coil are co-planar upon formation, with a fold line separating the display element the receiving coil, such that said receiving coil is positioned below the display element upon folding along the fold line.

3. The product display cover of claim 2, wherein said secondary cover can be adhesively attached to said product packaging.

4. The product display cover of claim 2, further comprising opposing side panels on said blank and further comprising rear extensions extending from each of said opposing side panels, wherein said display element, said receiving coil, said side panels and said rear extensions can be formed around said product packaging.

5. The product display cover of claim 1, wherein the receiving coil is printed on the blank.

6. An inductively coupled product display tag, comprising:
a front face, said face having at least one display element disposed thereon that is activated upon receiving power; and
a rear face, said rear face comprising; a receiving coil printed on said rear face, said receiving coil adapted to receive power from an inductive transmission coil located in proximity thereto; and
a circuit board printed on said rear face and coupled to said receiving coil, said circuit board and said receiving coil being electrically coupled to said at least one display element, wherein said receiving coil provides power to said at least one display element when in proximity to the transmission coil, thereby activating said display element.

7. The product display tag of claim 6, wherein said front face and said rear face are correspondingly sized and shaped.

8. The product display tag of claim 7, wherein said front face and said rear face are co-planar upon formation, with a fold line separating the front face from the rear face, such that said the rear face can be positioned behind the front face upon folding along the fold line.

9. The product display tag of claim 6, wherein said front face and said rear face are sized to be used in a channel for display tags.

10. The product display tag of claim 6, further comprising a plurality of display elements on said front face.

* * * * *